(12) United States Patent
Wang et al.

(10) Patent No.: US 10,395,044 B2
(45) Date of Patent: *Aug. 27, 2019

(54) METHOD AND APPARATUS FOR SECURING COMPUTER MASS STORAGE DATA

(71) Applicant: Janus Technologies, Inc., Half Moon Bay, CA (US)

(72) Inventors: Michael Wang, Taipei (TW); Joshua Porten, Austin, CA (US); Sofin Raskin, Los Altos, CA (US); Mikhail Borisov, Cupertino, CA (US)

(73) Assignee: Janus Technologies, Inc., Half Moon Bay, CA (US)

( * ) Notice: Subject to any disclaimer, the term of this patent is extended or adjusted under 35 U.S.C. 154(b) by 427 days.

This patent is subject to a terminal disclaimer.

(21) Appl. No.: 15/243,826

(22) Filed: Aug. 22, 2016

(65) Prior Publication Data

US 2016/0357973 A1 Dec. 8, 2016

Related U.S. Application Data

(63) Continuation of application No. 13/971,732, filed on Aug. 20, 2013, now Pat. No. 9,424,443.

(51) Int. Cl.
*G06F 12/00* (2006.01)
*G06F 21/60* (2013.01)
(Continued)

(52) U.S. Cl.
CPC .......... *G06F 21/602* (2013.01); *G06F 3/062* (2013.01); *G06F 3/0614* (2013.01);
(Continued)

(58) Field of Classification Search
None
See application file for complete search history.

(56) References Cited

U.S. PATENT DOCUMENTS 4,598,170 A 7/1986 Piosenka et al.
5,724,027 A 3/1998 Shipman et al.
(Continued)

FOREIGN PATENT DOCUMENTS

EP 2 407 905 1/2012
EP 2 517 144 10/2012
(Continued)

OTHER PUBLICATIONS

Garfinkel, "Terra: A Virtual Machine-Based Platform for Trusted Computing", ACM SOSP, Proc. of the ACM Symp. on Operating System Principles, Oct. 22, 2003, pp. 193-206.
(Continued)

*Primary Examiner* — Midys Rojas
(74) *Attorney, Agent, or Firm* — Foley & Lardner LLP

(57) ABSTRACT

In general, embodiments of the invention include methods and apparatuses for securely storing computer system data. Embodiments of the invention encrypt and decrypt SATA data transparently to software layers. That makes it unnecessary to make any software modifications to the file system, device drivers, operating system, or application. Encryption key management is performed either remotely on a centralized Remote Management System or locally. Embodiments of the invention implement background disk backups using snapshots. Additional security features that are included in embodiments of the invention include virus scanning, a virtual/network drive, a RAM drive and a port selector that provides prioritized and/or background access to SATA mass storage to a secure subsystem.

16 Claims, 7 Drawing Sheets

(51) Int. Cl.
  *G06F 12/14* (2006.01)
  *G06F 3/06* (2006.01)
  *G06F 12/16* (2006.01)
  *G06F 21/72* (2013.01)
  *G06F 21/80* (2013.01)
  *G06F 13/42* (2006.01)

(52) U.S. Cl.
  CPC .......... *G06F 3/0619* (2013.01); *G06F 3/0623* (2013.01); *G06F 3/0661* (2013.01); *G06F 3/0673* (2013.01); *G06F 12/14* (2013.01); *G06F 12/1408* (2013.01); *G06F 12/1416* (2013.01); *G06F 12/1425* (2013.01); *G06F 12/1458* (2013.01); *G06F 12/16* (2013.01); *G06F 13/4282* (2013.01); *G06F 21/72* (2013.01); *G06F 21/80* (2013.01); *G06F 2213/0032* (2013.01)

(56) References Cited

U.S. PATENT DOCUMENTS

| | | | |
|---|---|---|---|
| 5,987,572 | A | 11/1999 | Weidner et al. |
| 6,088,802 | A | 7/2000 | Bialick et al. |
| 6,507,914 | B1 | 1/2003 | Cain et al. |
| 6,546,491 | B1 | 4/2003 | Challener et al. |
| 6,594,780 | B1 | 7/2003 | Shen et al. |
| 6,782,424 | B2 | 8/2004 | Yodaiken |
| 7,120,892 | B1 | 10/2006 | Knol et al. |
| 7,149,992 | B2 | 12/2006 | Chang et al. |
| 7,240,303 | B1 | 7/2007 | Schubert et al. |
| 7,330,891 | B2 | 2/2008 | Yodaiken |
| 7,337,100 | B1 | 2/2008 | Hutton et al. |
| 7,350,204 | B2 | 3/2008 | Lambert et al. |
| 7,396,257 | B2 | 7/2008 | Takahashi |
| 7,516,217 | B2 | 4/2009 | Yodaiken |
| 7,962,755 | B2 | 6/2011 | Pizano et al. |
| 8,429,419 | B2 | 4/2013 | Endrys |
| 8,566,934 | B2 | 10/2013 | Srivastava et al. |
| 8,606,971 | B2 | 12/2013 | Cain et al. |
| 8,627,106 | B2 | 1/2014 | Pizano et al. |
| 2004/0199879 | A1 | 10/2004 | Bradfield et al. |
| 2007/0255963 | A1 | 11/2007 | Pizano et al. |
| 2008/0091833 | A1 | 4/2008 | Pizano |
| 2009/0013111 | A1 | 1/2009 | Berland et al. |
| 2009/0033668 | A1 | 2/2009 | Pederson et al. |
| 2009/0212844 | A1 | 8/2009 | Darmawan et al. |
| 2010/0024004 | A1 | 1/2010 | Boegelund et al. |
| 2010/0201400 | A1 | 8/2010 | Nardone et al. |
| 2011/0167113 | A1 | 7/2011 | Feng et al. |
| 2011/0258460 | A1 | 10/2011 | Pizano et al. |
| 2011/0296440 | A1 | 12/2011 | Laurich et al. |
| 2012/0017197 | A1 | 1/2012 | Mehta |
| 2012/0192129 | A1 | 7/2012 | Bowers et al. |
| 2013/0067534 | A1 | 3/2013 | Soffer |
| 2013/0132673 | A1 | 5/2013 | Saito et al. |
| 2013/0212671 | A1 | 8/2013 | Wang et al. |
| 2013/0238908 | A1 | 9/2013 | Pizano |
| 2014/0310441 | A1 | 10/2014 | Klughart |
| 2015/0052325 | A1 | 2/2015 | Persson et al. |

FOREIGN PATENT DOCUMENTS

| | | |
|---|---|---|
| KR | 10-2001-0053341 | 6/2001 |
| KR | 10-2006-0026024 | 3/2006 |
| KR | 10-2006-0041165 | 5/2006 |
| KR | 10-2008-0034898 | 4/2008 |
| TW | 201027338 A | 7/2010 |
| WO | WO-00/00889 | 1/2000 |
| WO | WO-2004/099940 | 11/2004 |
| WO | WO-2005/006109 | 1/2005 |
| WO | WO-2007/008540 | 1/2007 |

OTHER PUBLICATIONS

International Preliminary Report on Patentability for International Patent Application No. PCT/US2014/051699, dated Mar. 3, 2016, in 7 pages.
International Search Report dated Nov. 28, 2014 in corresponding PCT/US2014/51699.
Landau, et al., "SlitX: S;lit Guest/Hypervisor Execution on Multi-Core", 3rd Workshop of IO Virtualization, Jun. 14, 2011, pp. 1-7.
Taiwan Notice of Allowance and Search Report for Taiwan Patent Application No. 103128138, dated Jan. 25, 2018 6 pages.

METHOD AND APPARATUS FOR SECURING COMPUTER MASS STORAGE DATA

CROSS-REFERENCE TO RELATED APPLICATIONS

The present application is a continuation of U.S. application. Ser. No. 13/971,732 filed Aug. 20, 2013, now U.S. Pat. No. 9,424,443, the contents of which are incorporated by reference herein in their entirety.

FIELD OF THE INVENTION

The present invention relates generally to a system and method for securely storing data in a mass storage device, more particularly including security functions such as transparent data encryption and decryption, transparent backups and virus scanning of data stored in a SATA device.

BACKGROUND OF THE INVENTION

Conventional computing devices typically include one to many conventional types of input/output (I/O) ports for communicating with connectable external devices such as mice, keyboards, wireless modems, thumb drives, hard drives, etc., as well as internal devices such as hard drives and SSD drives.

However, the specifications for many I/O interfaces such as Serial AT Attachment (SATA) have no provision for authenticating attached SATA devices or encrypting SATA traffic. One way to secure SATA communications is by changing software layers (drivers, applications). This is impractical to implement due to the variety of different SATA stack implementations and the resulting lack of interoperability. This is one reason why this approach did not gain widespread adoption. Another option is to encrypt the entire file system. This approach also suffers from lack of interoperability. Both approaches have another disadvantage: the key to perform encryption is stored in the same system, which weakens overall security. Example prior art approaches include EP Application Number EP2407905 and EP Application Number EP2517144.

Meanwhile, there are a number of applications that would greatly benefit from efficient SATA data encryption, such as applications for storing sensitive data on SATA mass storage devices. Accordingly there remains a need for efficient techniques for securing SATA communication channels.

SUMMARY OF THE INVENTION

In general, embodiments of the invention include methods and apparatuses for securely storing computer system data. Embodiments of the invention encrypt and decrypt SATA data transparently to software layers. That makes it unnecessary to make any software modifications to the file system, device drivers, operating system, or application. Encryption key management is performed either remotely on a centralized Remote Management System or locally. Embodiments of the invention implement background disk backups using snapshots. Additional security features that are included in embodiments of the invention include virus scanning, a virtual/network drive, a RAM drive and a port selector that provides prioritized and/or background access to SATA mass storage to a secure subsystem.

In accordance with these and other aspects, a system for securely storing computer system data according to embodiments of the invention includes a mass storage device, a host processor system that executes an operating system and applications that produce and use data stored on the mass storage device, and a secure subsystem performs one or more security functions on the data transparently to and independently from the host processor.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, embodiments of the invention enable providing security over otherwise unsecured SATA data and communications. According to one aspect, embodiments of the invention implements encrypting and decrypting of data sent over a SATA channel. According to other aspects, embodiments of the invention implement mass storage snapshots and/or backups. According to further aspects, embodiments of the invention implement transparent mass storage virus scanning and compression. According to still further aspects, embodiments of the invention include a port multiplier providing access to multiple drives, including HDDs/SSDs, RAM drives, virtual network drives and Snapshot drives. According to certain additional aspects, the security functions performed by embodiments of the invention can be logically transparent to the upstream host and to the downstream device.

Figure 1:
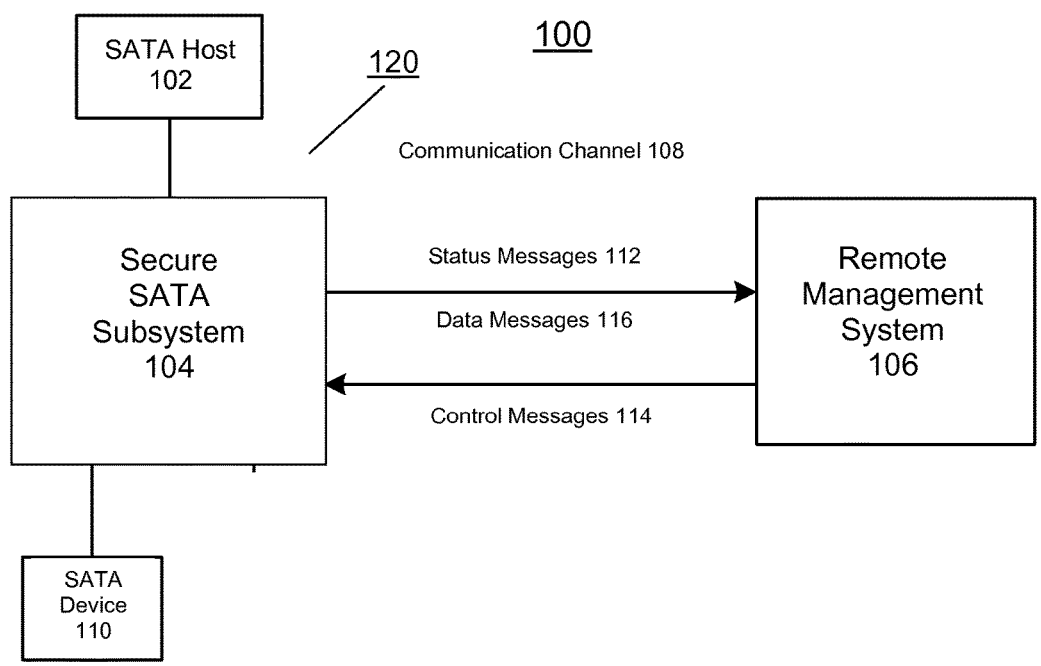
FIG. 1 is a block diagram illustrating an example subsystem for securing SATA data and communications according to embodiments of the invention.

FIG. 1 is a system level block diagram of a system 100 for managing security of a computer mass storage device according to embodiments of the invention. As shown, system 100 includes a managed secure computer 120 comprising a SATA host 102, Secure SATA Subsystem 104, and SATA device 110.

In one non-limiting example configuration according to embodiments of the invention, secure computer 120 is a standalone computer system, similar to a conventional desktop, laptop or pad computer. In such an example, host 102 is implemented as part of a host CPU's set of I/O peripherals (e.g. an x86 Southbridge or PCH chip), and communicates with a conventional operating system such as Windows and associated device driver software. In accordance with certain aspects of the invention, in this example, the operation and functionality of subsystem 104 is completely transparent to the host CPU and associated operating system and application software. Moreover, the operating experience of secure computer 120 by a user is identical to the experience of a conventional desktop, laptop or pad computer, apart from the security functionality of the present invention. So while the application software that can run on the computer is virtually unrestricted, use of devices 110 is strictly controlled by subsystem 106 which enforces security policies as will be described in more detail below.

In these and other embodiments, subsystem 104 is preferably an embedded system. As such, it runs a designated software system furnished together with an embedded processor, and cannot be modified by the end-user of the computer under any circumstances. According to aspects of the present invention, subsystem 104 is responsible for performing security functions such as parsing and transparently encrypting or decrypting data streams.

An example architecture for implementing subsystem 104 together with a host CPU in a secure computer 120 is described in U.S. Pat. No. 9,231,921, the contents of which are incorporated by reference herein. Those skilled in the art will understand how to implement the principles of the present invention in various configurations of secure computer 120 after being taught by the present disclosure.

SATA device 110 comprises a SATA standard interface included in internal or external storage devices such as disk drives and solid state drives Although FIG. 1 shows only one SATA device 110 and SATA host 102, it should be appreciated that there can be several SATA devices and hosts in a single computer 120, either managed by respective subsystems 104 or the same subsystem 104. Moreover, although the present invention will be described in detail with respect to the SATA standard, those skilled in the art will be able to implement the invention with devices and communications according to similar standards such as eSATA, mSATA, etc. after being taught by the present disclosure.

Still further, it should be appreciated that the present invention can be applied to each current or future version of SATA (e.g. SATA revisions 1.0, 2.0, 3.0, etc.).

Various aspects of the types of security functionality performed by secure SATA subsystem 104 that can be adapted for use in the present invention are described in more detail in co-pending application Ser. No. 13/971,582, the contents of which are incorporated herein by reference in their entirety.

FIG. 1 further shows a Remote Management system 106 coupled to secure subsystem 104 of secure computer 120 by a communication channel 108. FIG. 1 also shows the different message types that can be sent over a Communication Channel 108, specifically status messages 112 from secure subsystem 104 to remote management system 106, control messages 114 from remote management system 106 to secure subsystem 104 and data messages 116 from secure subsystem 104 to remote management system 106.

Although FIG. 1 shows remote management system 106 coupled to only one secure subsystem 104, it should be apparent that one or more additional secure subsystems 104 may be similarly coupled to remote management system 106.

Channel 108 can be implemented in various ways, possibly depending on the number and type of devices to be managed by system 106. In some embodiments, channel 108 can be a separate direct point-to-point link between system 106 and subsystem 104. In other embodiments, channel 108 can be implemented by a transmission medium that is shared between many subsystems 104. In these and other embodiments, channel 108 can include any combination of wired or wireless media, such as Ethernet or Wireless LAN, and can include switches and routers between system 106 and subsystem 104. In these and other embodiments, channel 108 can be implemented by various types and/or combinations of public and private networks using proprietary protocols running on top of or conventional protocols such as UDP or TCP. In embodiments, data sent over communication channel 108 is encrypted, for example using secure VPN, to improve security.

According to general aspects, in embodiments of the invention, remote management system 106 is responsible for managing policies that can include lists of allowed devices as well as their encryption keys. Based on these lists, and devices attached to interfaces of computer 120, remote management system 106 sends appropriate configuration information such as encryption keys to subsystem 104 via channel 108.

Accordingly, control messages 114 sent from Remote Management System 106 to one or more Secure SATA Subsystems 104 contain different configuration commands and settings such as encryption keys and virus signatures to be described in more detail below. Status messages 112 sent from one or more Secure SATA Subsystems 104 to Remote Management System 106 contain different notifications and alerts. Example of status messages 112 include notifications of attached devices 110. Data messages 116 sent from one or more Secure SATA Subsystems 104 to Remote Management System 106 contain data from secure devices such as virus suspicions and/or detections, usage statistics such as disk activity level and access time monitoring, capacity used/remaining, disk health, snapshot readiness, etc.

Various aspects of a remote management system and/or security policies that can be adapted for use in the present invention are described in more detail in U.S. Pat. No. 9,215,250, the contents of which are incorporated herein by reference in their entirety.

Figure 2:
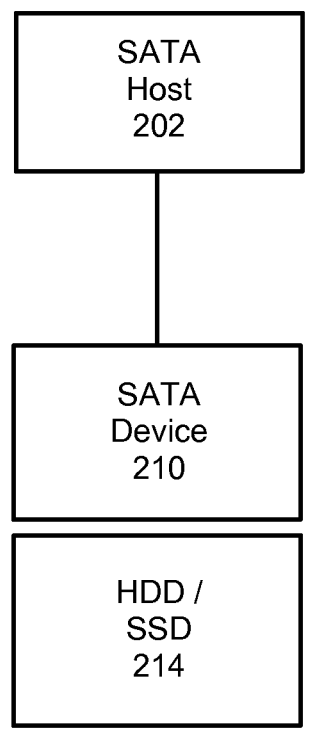
FIG. 2 is a block diagram illustrating existing SATA communications.

As mentioned previously, aspects of the invention include providing security functionality to otherwise unsecure SATA interfaces. FIG. 2 shows an existing SATA system. It consists of SATA Host 202 and SATA Device 210. As is known, SATA uses a point-to-point architecture. The physical connection between a SATA host and a SATA device is not shared among other hosts and devices. In a common implementation, PC systems have SATA controllers supporting SATA hosts 202 built into the motherboard, typically featuring two to eight ports. Additional ports can be installed through add-in SATA host adapters plugged into system bus slots (e.g. PCI). The data connection between a SATA host 202 and a SATA device 210 (integrated into a hard drive or solid state drive 214 in this example) is typically provided through a standard 7-conductor data cable having separate transmit and receive conductor pairs, with each using differential signaling. It should be noted that there are other types of SATA connectors such as eSATA and mSATA that can also be used with the present invention.

Figure 3:
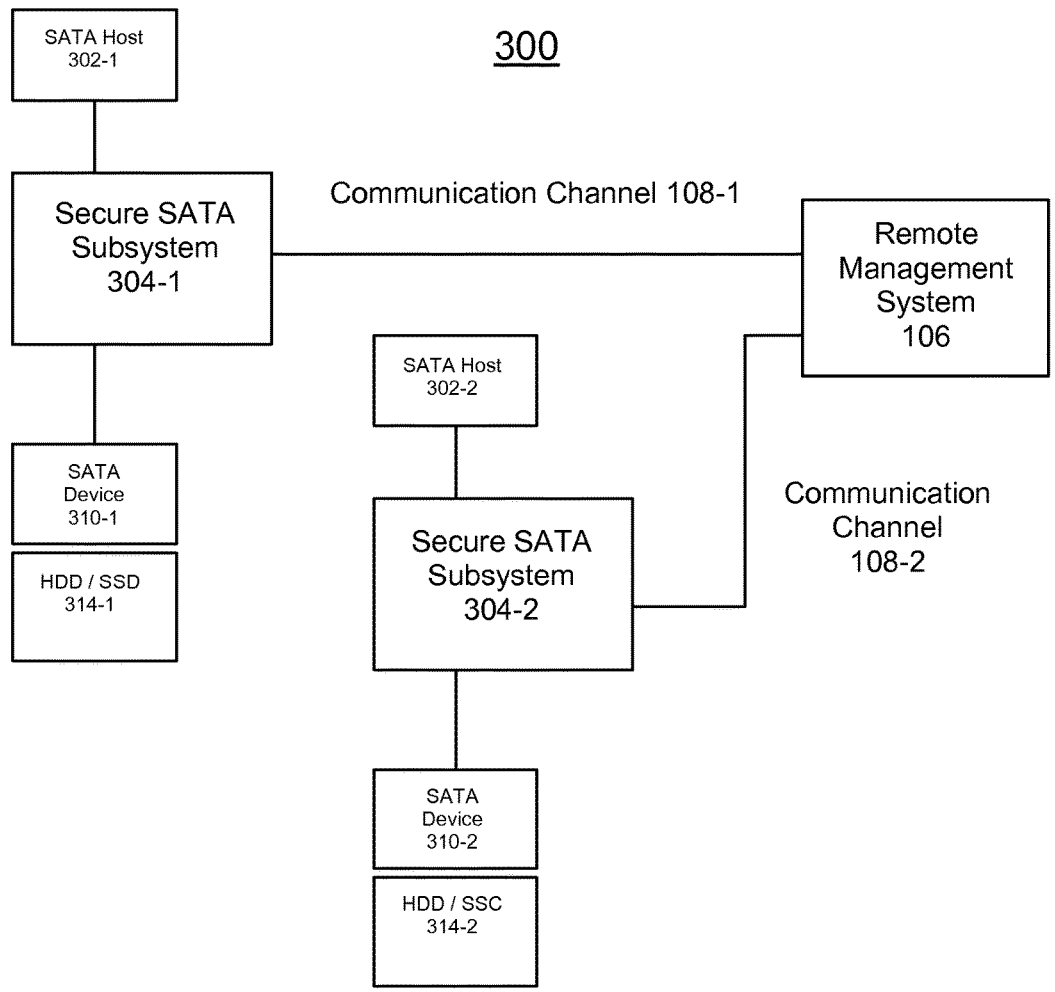
FIG. 3 is a block diagram illustrating an example management system for securing SATA data and communications according to embodiments of the invention.

FIG. 3 is a block diagram illustrating another example management system 300 according to embodiments of the invention. In this example, the system manages security of two secure SATA subsystems 304-1 and 304-2 connected to Remote Management System 106 via respective communication channels 108-1 and 108-2.

As can be seen in comparison to FIG. 2, the topology of the system 300 is made secure by the inclusion of secure SATA subsystems 304, remote management system 106 and communication channel 108.

Figure 4:
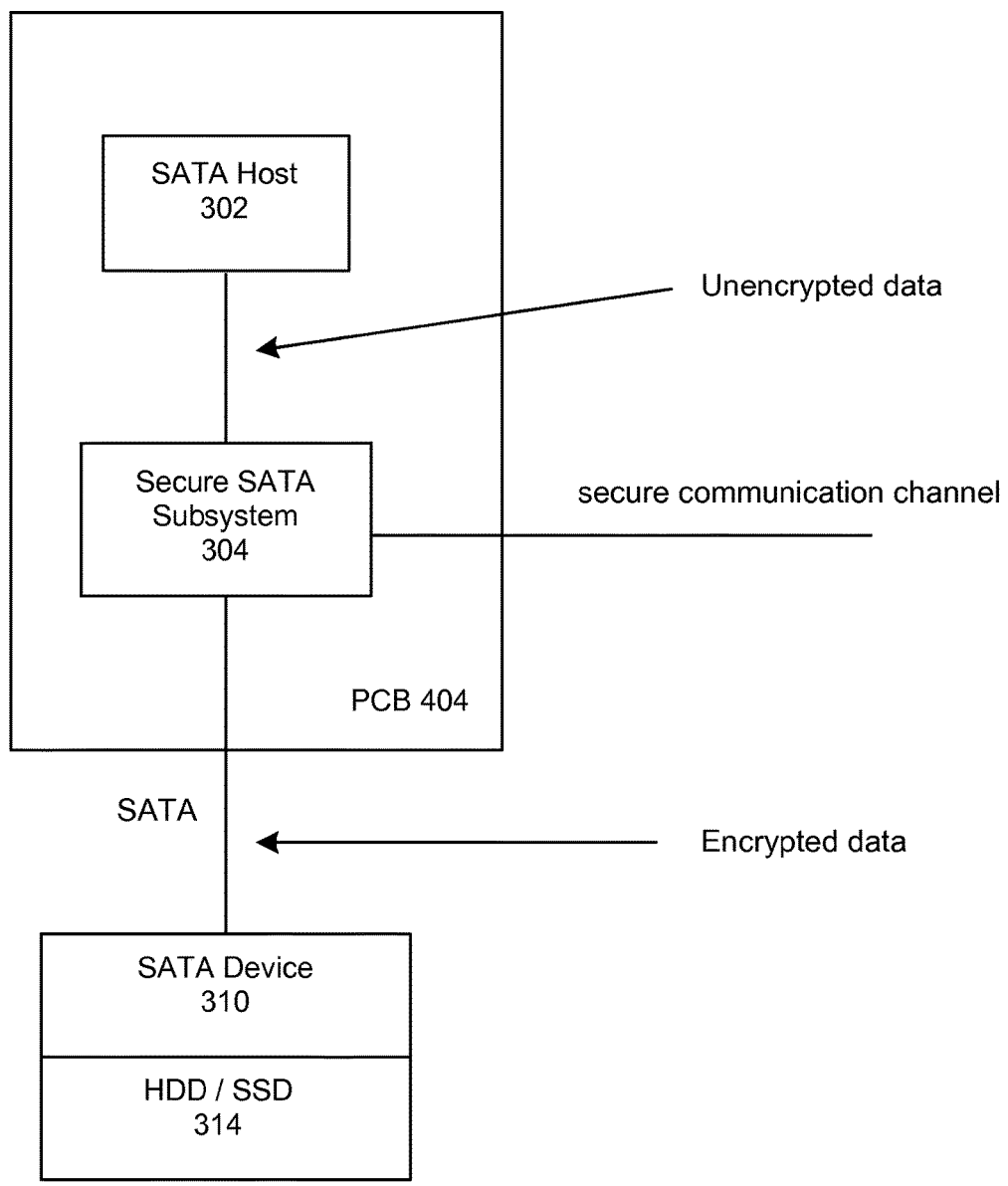
FIG. 4 is a block diagram further illustrating an example implementation for the secure SATA subsystem shown in FIG. 3.

As set forth above in connection with the more general example of FIG. 1, and as will be described in more detail below, secure SATA subsystems 304 are responsible for parsing and transparently encrypting or decrypting data streams according to policies managed by remote system 106 and keys provided by remote system 106. In embodiments such as that shown in FIG. 4, SATA host 302 (and possibly a host CPU) and subsystem 304 are together implemented on a single chip or semiconductor device (e.g. SOC) mounted on printed circuit board (PCB) 404. Alternatively, SATA host 302 and subsystem 304 can be implemented in different chips and separately mounted on PCB 404. In either implementation of this embodiment, unencrypted data is securely communicated between subsystems 304 and SATA hosts 302 by virtue of subsystems 304 and hosts 302 being inaccessible to third parties. For example, where 404 is a PCB and host 302 and subsystem 304 are in separate chips, communication signals between them can be buried inside PCB circuit traces. As further shown, subsystem communicates encrypted data with a SATA device 310 (typically integrated together with physical storage device 314 such as a hard drive or solid state drive) that is external to PCB or SOC 404 via a cable. For example, the HDD/SDD 314 is detachable and its SATA connection to subsystem 304 is easily accessible for eavesdropping. In example embodiments, software and hardware layers above SATA Host 302 are also protected from eavesdropping, for example by using passwords or biometric identifications (e.g. thumb print, face recognition, iris scans, etc.).

In accordance with additional aspects of the invention, embodiments of secure SATA subsystem 304 are responsible for creating snapshots of data stored on HDD/SDD 314, perhaps at pre-defined discrete points in time defined by configurations provided by remote management system 106. In accordance with still further aspects of the invention, embodiments of secure SATA subsystem are responsible for performing data checks on HDD/SSD's 314 such as virus scans.

As set forth above, communication Channel 108 is responsible for secure transmission of encryption keys for encrypting data stored on HDD/SSD's 314 from remote management system 106 to secure SATA subsystems 304, and status and command messages between subsystems 304 and management system 106 (e.g. virus alerts, disk health, usage, etc.). Additionally, in some embodiments, channel 108 also carries disk drive snapshot data. This snapshot data can be encrypted and optionally compressed.

Figure 5:
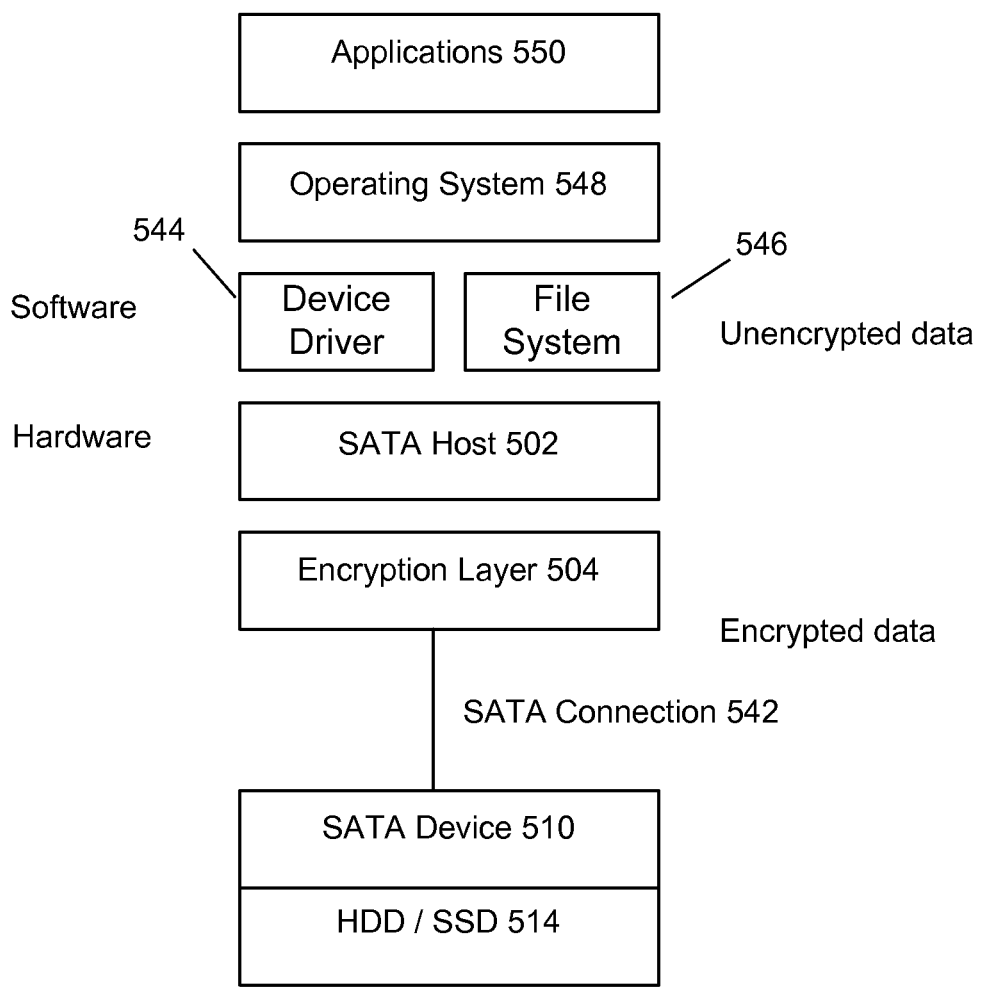
FIG. 5 is a block diagram illustrating how example secure SATA subsystems according to embodiments of the invention are included in the data flow of typical hardware and software layers.

FIG. 5 is another view of a system for securing SATA communications according to embodiments of the invention, broken down into software and hardware layers involved in the data flow.

In this example, the hardware device associated with SATA device 510 is a physical storage device 514, such as a hard drive or SSD. SATA Device 510 is responsible for converting data carried by an industry-standard SATA protocol into a vendor-specific data format used by the physical Storage Device 514. SATA Device 510 is connected to the Secure Subsystem 504 via a connection 542 such as a SATA standard cable, eSATA, or mSATA. As shown, subsystem 504 in this embodiment of the invention implements an Encryption Layer. It performs transparent encryption and decryption of the data passing between SATA Host 502 and Device 510. It should be noted that embodiments of subsystem 504 can perform additional security functions such as virus scanning, etc., as explained in more detail below.

As further shown in FIG. 5, in software layers above SATA host 502 are device driver 544 and file system 546. Examples of File Systems are FAT32, NTFS, or ext4. According to aspects of the invention, both SATA Device Driver 544 and File System 546 are unaware of the fact that the data is encrypted.

In software layers above device driver 544 and file system 546 is operating system 548. Examples of Operating Systems are Linux, Mac OS, Windows, Android, or iOS. Applications 550 are shown in software layers above operating system 548.

Figure 6:
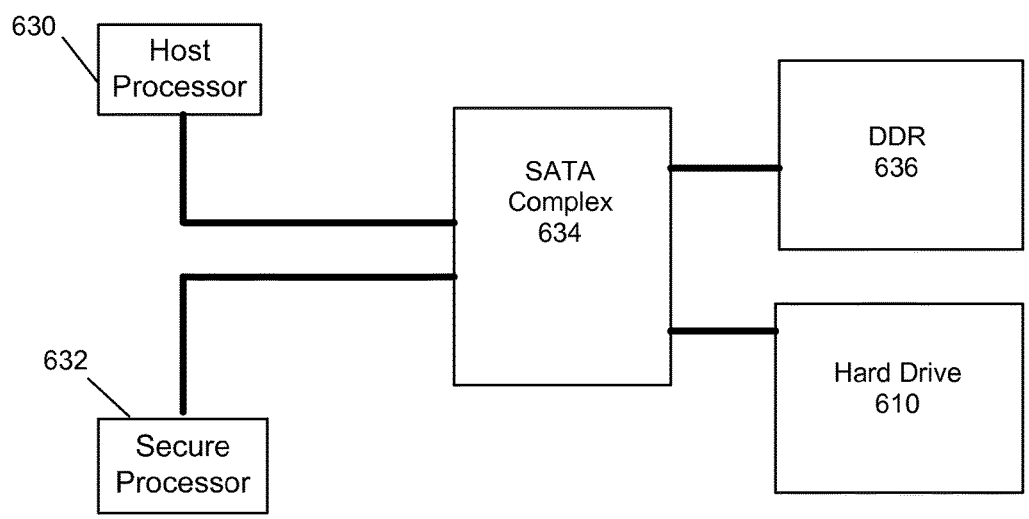
FIG. 6 is a top-level block diagram illustrating an example secure SATA subsystem that can implement the subsystem shown in FIG. 5 in a secure computer according to embodiments of the invention.

FIG. 6 is a top-level block diagram of one example of a secure computer 620 according to embodiments of the invention. As shown, it includes separate host processor 630 and secure processor 632, both connected to SATA complex 634. A SATA hard drive 610 (which includes an integrated SATA device) is also connected to SATA complex, 634 as is DDR memory 636. In embodiments, DDR memory 636 is provided for use by secure processor 632 for such functions as caching local snapshot data, scanning blocks of data from disk, for storing data for secure processor 632's application memory. It should be noted that there are many variants of DDR that can be used in embodiments of the invention, such as DDR2, DDR3, LPDDR, etc.

Thick lines indicate high speed data paths between host processor 630, HDD 610, DDR memory 636, secure processor 632 and SATA complex 634.

Additionally or alternatively, DDR memory can be used by secure processor 632 as a RAM drive to accelerate storage processing. As a RAM drive, it can be served as a volatile storage or working memory for the operating system on host processor 630. Being volatile, its contents are erased when the system 620 is powered down. In some embodiments, the RAM drive can be used as a replacement to a HDD. In these possible embodiments, there is no permanent storage for the host processor 630. All files created and used by host processor 630 are stored on a network file server and downloaded to the RAM drive in memory 636 as needed via remote management system 106. The host's operating system and applications could be stored in on-board FLASH memory and loaded into RAM drive in DDR memory 636 on boot and as needed. As files on the RAM drive are changed, they are uploaded to the network file server via remote management system 106. This could be considered an extreme form of security where no user data/files are permanently stored on the PC. It also requires the user to be connected to the network in order to use the PC in a meaningful way In the above and other embodiments, where DDR memory 636 can also be accessed by host processor 630, some portion is preferably exclusively reserved for access by secure processor 632.

In embodiments, secure computer 620 is similar to a conventional standalone desktop or laptop computer, with the exception of secure processor 632, SATA complex 634 and DDR 636, which together implement a secure SATA subsystem. For example, host processor 630 can include a conventional PC processor system including a conventional x86 processor running a standard operating system such as Windows and can further include standard SATA device drivers and hardware interfaces and SATA hosts. The host processor 630 operating system, drivers and applications operate without awareness of the security functionality being performed by secure processor 632, SATA complex 634 and DDR 636.

In embodiments, both host and secure processors 630 and 632 are connected to SATA complex 634 as masters, meaning that they can initiate SATA transactions, with the targets being DDR 636 and Hard Drive 610. Accordingly, secure processor 632 can access the drive in the background, without interfering with the host processor's access (i.e. no performance degradation) using a prioritized arbitration scheme. The arbitration can determine who has priority access (typically the host processor 630) and by how much (e.g. for a given number of outstanding SATA commands, how many come from the host 630 and how many from the secure processor 632). The drive is thus shared by both processors 630, 632, which enables secure processor 632 to perform background tasks, like virus scanning, content identification for "context-based far-end" storage, etc.

Figure 7:
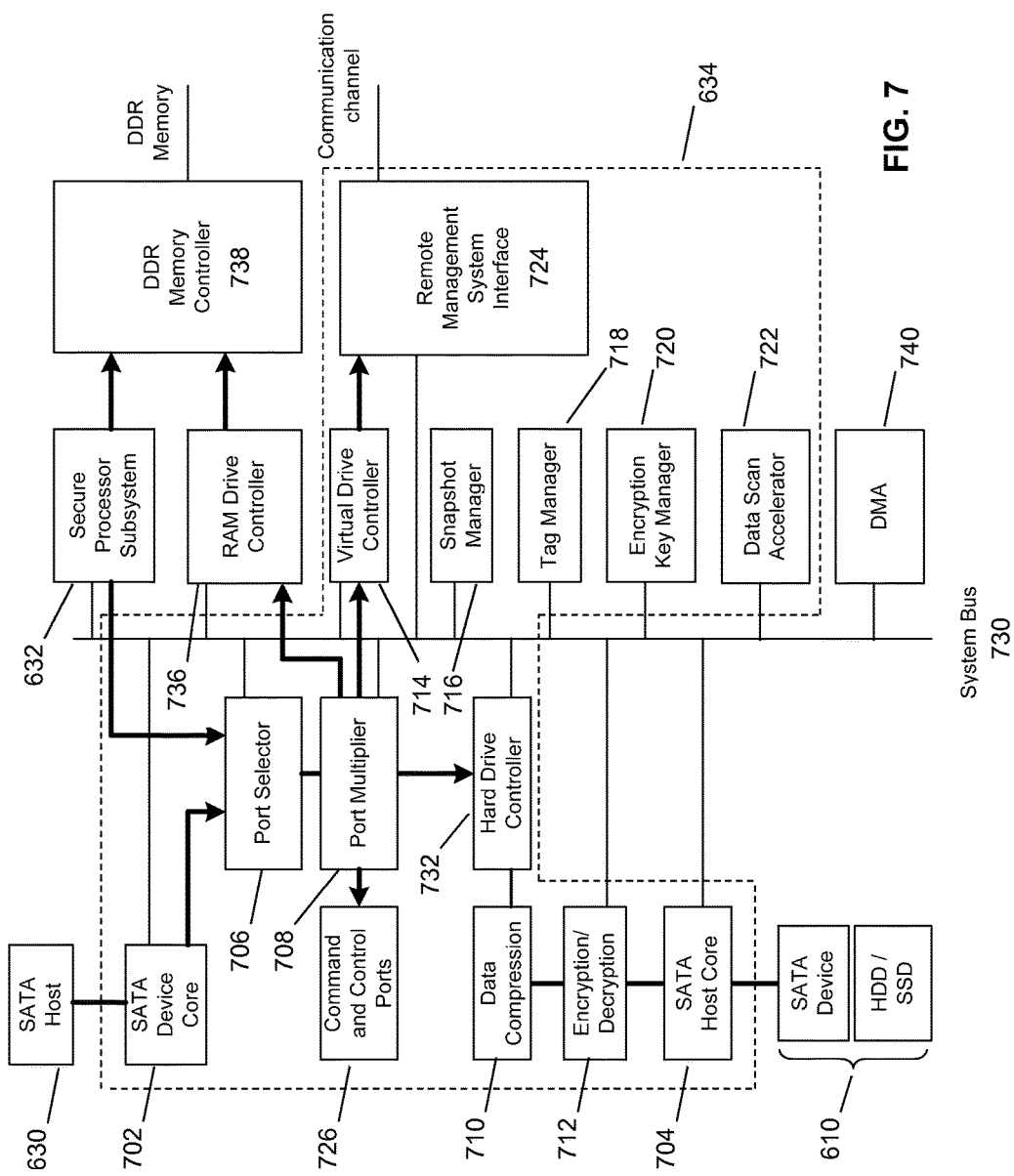
FIG. 7 is a block diagram illustrating an example configuration of a SATA complex that can be included in a secure SATA subsystem such as that shown in FIG. 6.

FIG. 7 is block diagram that shows an example SATA Complex 634 according to embodiments of the invention in more detail.

As shown, and with reference to the overall computer system diagram in FIG. 6, SATA complex 634 is included in an overall system 620 with a SATA host (implemented by host processor 630), SATA device 610, secure processor 632 and DDR memory 634. As in FIG. 6, thick lines indicate high speed data paths between SATA Host 630, Device 610, DDR memory 636 and remote management system 106. Other lines shown in FIG. 7 are control paths.

As shown in this example, SATA complex 634 includes SATA device core 702, SATA host core 704, port selector 706, port multiplier 708, data compression block 710, encrypt/decrypt block 712, virtual drive controller 714, snapshot manager 716, tag manager 718, encryption key manager 720, data scan accelerator 722, and remote management system interface 724. Aspects of these components will be described in more detail below. Hard drive controller 732 implements the DDR and HDD drive access functionality described above.

As further shown in this example, system 620 further includes computer system components such as system bus 730 (e.g. an ARM processor AXI system bus), command and control ports 726, RAM drive controller 736, DDR memory controller 738 and DMA 740. Implementation and operation details of these components will become apparent to those skilled in the art from the examples provided below, so detailed descriptions thereof will be omitted for sake of clarity of the invention.

It should be noted that computer 620 and/or SATA complex 634 can include additional components not shown in FIG. 7. For example, SATA complex 634 can include data buffers such as FIFOs to buffer data flowing to/from SATA Host 630 and Device and host Cores 702, 704, Memory Controller 738, and Remote Management System Interface 724. It should be further noted that computer 620 and/or SATA complex 634 can include fewer components than those shown in FIG. 7, for example depending on the particular combination of SATA security functionality that is supported in a particular embodiment of secure computer 620. It should be still further noted that, although shown separately for ease of illustration, certain or all of the components of SATA complex 634 and secure processor subsystem 632 can be implemented together in any combination of hardware, software or firmware. In one example implementation, they are all provided in a single ASIC (i.e. system on chip (SOC)). According to aspects of the invention, in all implementations they are provided such that communication between Host Processor 630, Secure Processor 632, and SATA Complex 634 is inaccessible to the user or third parties.

According to transparency aspects of the invention, SATA Device core 702 and Host Core 704 operate as peer devices to corresponding SATA Host 630 and SATA Device 610. As such, from the protocol standpoint, they render the secure subsystem of the invention transparent to SATA host 630 and SATA device 610. Moreover, cores 702 and 704 preferably provide the full suite of standard SATA features. Those skilled in the art of SATA devices will understand how to implement SATA device core and host core 704 after being taught by the present disclosure and the SATA specification.

To further implement the transparency aspects of the invention, port selector 706 controls access to the data path to the SATA device/drive 610 to either SATA Host 630 or Secure Processor 632. The output of port selector 706 is connected to the Port Multiplier 708, which routes SATA channel data to either Hard Drive 610 (via hard drive controller 732), RAM Drive controller 736, Virtual Drive Controller 714 or Snapshot Drive controller (via snapshot manager 716).

An example embodiment of SATA complex 634 includes a 16 Port Multiplier 708, configured as follows: Port 0 couples the SATA channel to HDD 610; Port 1 couples the SATA channel to RAM drive controller 736 for accelerating storage processing or as a sole drive in the system; Port 2 couples the SATA channel to the snapshot manager 716 to enable the user to select one of the locally stored snapshots to be mounted as a Snapshot Drive visible to the host processor 630; Ports 3-14 are virtual network drives to provide access to network-based storage; and Port 5 is a control port that implements registers for internal port management. Additional operational details of performing transparent encryption/decyption and providing virtual drives will be provided below.

Further supporting transparency aspects of the invention, tag manager 718 is responsible for translating SATA command tags into a tag range used by SATA Complex 634. The translation enables parallel access by Host 630 and Secure Processor 632 to the HDD 610. Tags implement a command queue for the SATA Host to queue up commands and for the SATA Device to execute them one at a time, thus decoupling the SATA Host from the Drive. For example, SATA allows up to 32 outstanding queued commands for the drive to execute (e.g. write block at LBA 5). The SATA queued commands from the host and secure processors are mapped into a single command queue while prioritizing commands from each processor (based on arbitration logic prioritization).

The overall operation of secure SATA complex 634, including the security functionality of the invention, is controlled by secure processor 632. As shown in this example, Secure Processor 632 can be implemented by a subsystem that consists of one or more CPU cores and embedded software. The embedded software controls overall system operation: reset, initialization, configuration, setting up DMA between different devices, managing encryption keys and communications with Remote Management System 106 via remote management system interface 724, and managing when and how snapshots are created/deleted, etc. The embedded software can also run various related applications such as scanning the drive for viruses. The scanning can include looking for virus signatures provided by the remote management system 106. Those skilled in the art will be able to understand how to implement embedded software for processor subsystem 632 after being taught about the functionalities performed by subsystem 632 as described in more detail herein.

Secure processor subsystem 632 has full (prioritized and background) access to drive 610 for performing some or all of the following security functions: anti-virus scanning; configuring the drive 610 for encryption and compression; trapping and executing all non-block-data SATA commands (e.g. configuration/status commands, non LBA read/writes, the IDENTIFY command, status commands); managing transparent backup/snapshot functions; and managing snooping functions such as keyword scanning. Aspects of these security functions will be described in more detail below.

In embodiments, secure processor subsystem 632 has higher priority access to drive 610 and RAM Drive 736 to ensure proper configuration only during system power-on, or optionally during periodic virus scans performed without the knowledge of the host 630. Otherwise, the host processor will have priority access to the drive (for normal block read/write operations).

Secure processor subsystem 632 communicates control information such as device 610 status (e.g. drive usage, capacity, etc.) and security configurations including encryption keys with remote management system 106 via remote management system interface 724 (RMS IF) and Communication Channel 108, typically implemented as Ethernet. Secure processor subsystem 632 also controls other SATA complex 634 data communications with remote management system 106. In embodiments, remote management system (RMS) IF 724 encrypts, and optionally compresses data passed on Communication Channel 108. Aspects of these additional data communications will become apparent from the descriptions below.

In embodiments, secure processor subsystem 632 includes functionality for performing authentication. For example, a sector on the drive 610 is dedicated for meta-data (drive-specific information). A single key is provided for all drives to read that encrypted data. Meanwhile, each drive will have its own key for all other data on the drive.

Additionally or alternatively, secure processor subsystem 632 also maintains activity and statistics regarding drive 610, such as how many reads and writes took place over specified periods of times, a histogram of block addresses, accessed, etc., and can periodically send this data to the remote management system 106, or upon command from system 106.

According to aspects of the example embodiment of the invention shown in FIG. 7, all data written to hard drive 610 is transparently compressed and then encrypted by compression block 710 and encryption block 712, and all data read from the hard drive 610 is decrypted and decompressed by blocks 712 and 710, respectively. The reading process is symmetric to the writing process. According to further aspects of the invention, the operation of data compression module 710 and/or encryption/decryption module 712 can be enabled or disabled by secure processor subsystem 632, perhaps in accordance with security policies and/or configurations received from remote management system 106. Moreover, the operations of blocks 710 and/or 712 can be controlled based on the type of data. For example, all the data coming from SATA host 630 can be encrypted and compressed, whereas data coming from secure processor 632 is not encrypted. The actual SATA commands from host 630 or secure processor 632 (e.g. to perform read/write access, control the drive, or to read status) are not encrypted or compressed.

Encryption Key Manager 720 manages a local cache of keys used for data encryption/decryption by block 712. Embodiments of encryption key manager 720 can operate in a local mode, where keys are managed without remote management system 106 involvement. In these and other embodiments, encryption key manager 720 can also or alternatively receive keys from remote management system via remote management system interface 724.

Example aspects of performing transparent encryption and decryption of SATA communications that can be adapted for use by encryption/decryption block 712 in the present invention are described in U.S. Pat. No. 9,076,003, the contents of which are incorporated herein by reference in their entirety. Compression/decompression block 710 can be implemented by a variety of known compression techniques such as LZW or any other dictionary-based compression algorithm.

Snapshot Manager 716 controls functionality for transparently creating snapshots of data in device 610 and/or backups of such data. The timing and enabling/disabling of such snapshots and/or backups can be controlled by secure processor subsystem 632, perhaps in accordance with configurations and/or policies communicated by remote management system 106.

In embodiments, snapshot manager 716 obtains data from device 610 and temporarily stores the data in DDR memory 636 via port selector 706 and DDR memory controller 738. In these and other embodiments, secure processor subsystem 632 controls sending of certain or all of the stored snapshot data to the remote management system 106 via remote management interface 724.

Example aspects of performing transparent snapshots or backups of data stored on a mass storage drive such as device 610 that can be adapted for use by snapshot manager 716 in the present invention are described in U.S. Pat. No. 9,384,150, the contents of which are incorporated herein by reference in their entirety.

According to additional aspects of the present invention, snapshot manager 716 enables the host user to select and mount one of any previously saved Snapshots that are stored on the HDD/SSD 610 as a Snapshot Drive. In embodiments, snapshot manager 716 can further allow older Snapshots to be retrieved from the backup server associated with remote management system 106 (via communication channel 108).

Data Scan Accelerator 722 controls functionality for performing various checks on data in device 610. The types, timing and enabling/disabling of such checks are controlled by secure processor subsystem 632, perhaps in accordance with configurations and/or policies communicated by remote management system 106. It may perform the following types of data checks: regular expressions, signature checks, and virus scanning. Embodiments of accelerator 722 are preferably implemented in hardware which is typically faster than software implementations. In addition, according to aspects of the invention, scans are performed concurrently with other SATA activities.

According to aspects of the invention, port multiplier 708 enables a single SATA Host to access multiple SATA drives. In embodiments, the host CPU, through its SATA host 630 interface, connects to the port multiplier in the SATA Complex 634. The port multiplier 708 in this example is connected to a number of drives: the physical HDD or SSD 610, a RAM drive implemented in the DDR memory, a number of virtual Network drives (these are physical drives located in a data center that are accessed by the computer 120 over communication channel 108 via the remote management system 106, like NFS, and a Snapshot Drive (via snapshot manager 716). Accordingly, in this example, a host user "sees" all of these different types of drives and can access them through a conventional file system such as Windows Explorer.

Virtual drive controller 714 provides access to a virtual network-based drive that is provided via remote management system 106. As set forth above, there might be several virtual drives that appear the same as real drives to the host 630, but physically implemented elsewhere via remote management system 106 and managed by virtual drive controller 714.

It should be noted that, although not shown in FIG. 7, embodiments of the invention can include functionality for snooping of SATA data communicated between SATA host 630 and SATA HDD/SSD 610, such as that described in more detail in co-pending application Ser. No. 13/971,604. Those skilled in the art will be able to adapt the techniques described in that application for use in SATA complex 634 after being taught by the present disclosure.

In the example embodiment shown in FIG. 7, movement of data between HDD 610, DDR 636, SATA Host 630, and Secure Processor 632 is performed using DMA 740. Modules that can setup DMA 740 for such data transfers are Secure Processor 632, port selector 706, Snapshot Manager 716, Tag Manager 718, and Data Scan Accelerator 722.

Relatedly, DDR memory 636 can be used as temporary storage for snapshot data as described above, as well as storage for data blocks being transferred between host 630/secure host 632 and device 610, queued commands (e.g. for reading and writing data to device 610), and miscellaneous data structures.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A system for securely storing computer system data comprising:
    a mass storage including a SATA device;
    a host processor system including a SATA host, the host processor system executing an operating system and applications that produce and use data stored on the mass storage via the SATA host; and
    a secure subsystem including a SATA complex, the secure subsystem being interposed between the SATA host of the host processor system and the SATA device of the mass storage,
    wherein the SATA complex includes a SATA device core that communicates with the SATA host of the host processor system when the operating system and applications are producing and using the data stored on the mass storage device.

2. A system according to claim 1, wherein the secure subsystem includes an encryption module that transparently encrypts the data produced by the operating system and applications of the host processor system before it is stored on the mass storage.

3. A system according to claim 2, wherein the secure subsystem includes a decryption module that transparently decrypts the data stored on the mass storage that was encrypted by the encryption module before it is used by the operating system and applications of the host processor system.

4. A system according to claim 1, wherein the secure subsystem includes a port selector for controlling an input and output of data on the mass storage device.

5. A system according to claim 4, wherein the port selector chooses to input the data from either the host processor system or the secure subsystem.

6. A system according to claim 4, wherein the port selector chooses to output data to either the mass storage, a RAM drive included in the secure subsystem, or a virtual drive.

7. A system according to claim 4, wherein the port selector enables prioritized access to the mass storage device by either the host processor system or the secure subsystem.

8. A system according to claim 1, wherein the secure subsystem includes a port multiplier for providing a host drive interface in the host processor system access to a plurality of drives.

9. A system according to claim 8, wherein the plurality of drives include one or more of a hard drive, a solid state drive, a RAM drive, a virtual drive, and a snapshot drive.

10. A system according to claim 1, further comprising a volatile memory, wherein the secure subsystem includes a RAM drive controller coupled to the volatile memory for providing the host processor system access to a RAM drive in the volatile memory.

11. A system according to claim 1, further comprising a remote management system interface adapted to be coupled to a network, wherein the secure subsystem includes a virtual drive controller coupled to the remote management system interface for providing the host processor system access to a virtual drive in the network.

12. A system according to claim 1, wherein the secure subsystem includes a snapshot manager that provides the host processor system access to one of a plurality of stored snapshots of the data on the mass storage.

13. A system according to claim 1, wherein the mass storage comprises a hard disk drive.

14. A system according to claim 1, wherein the mass storage comprises a solid state disk drive.

15. A standalone computer system, comprising:
a host processor subsystem that executes an operating system and applications that produce and use host data, the host processor subsystem having an interface for causing the host data to be stored on and accessed from a mass storage device;
a secure subsystem that communicates with the interface so as to control the storage and access of the host data transparently to and independently from the host processor subsystem, and wherein the secure subsystem selectively causes the host data to be stored on one of a RAM drive in volatile memory in the standalone computer system, a hard drive in the standalone computer system or a virtual drive on a network; and
a motherboard to which the host processor subsystem and the secure subsystem are commonly attached.

16. A standalone computer system according to claim 15, wherein the interface comprises a SATA host, the secure subsystem including a SATA device core for communicating with the SATA host.

* * * * *